United States Patent [19]

Smith

[11] Patent Number: 5,174,901
[45] Date of Patent: Dec. 29, 1992

[54] LIQUID PURIFYING SYSTEM

[76] Inventor: Verity C. Smith, 561 Bridge St., Dedham, Mass. 02026

[21] Appl. No.: 713,138

[22] Filed: Jun. 10, 1991

[51] Int. Cl.$^5$ .................. B01D 15/04; B01D 24/00; B01D 61/02; B01D 61/08
[52] U.S. Cl. .................................. 210/652; 210/660; 210/806; 210/807; 210/260; 210/264; 210/321.72
[58] Field of Search ............... 210/202, 660, 767, 806, 210/807, 661, 252, 259, 260, 263, 264, 284, 652, 644, 321.6, 321.72, 634

[56] References Cited

U.S. PATENT DOCUMENTS 4,659,463  4/1987  Chandler et al. .................. 210/202

Primary Examiner—Frank Sever
Attorney, Agent, or Firm—Lorusso & Loud

[57] ABSTRACT

In a system for purifying liquid, a method is provided wherein the liquid is pretreated by passing it through a sand filter water softener and carbon filter for removal of hardness and particulate matter. The liquid is then pumped through a reverse osmosis membrane for removal of organic compounds and ionized and biological impurities. The liquid passes from the reverse osmosis membrane through a strong acid cation exchange resin for removal of the cations present in the reverse osmosis effluent. The acidified liquid is neutralized by passing it through calcium carbonate, thus adding calcium salt and carbonic acid to the liquid for a better tasting, calcium-enriched product.

23 Claims, 1 Drawing Sheet

LIQUID PURIFYING SYSTEM

BACKGROUND OF THE INVENTION

The present invention relates generally to liquid purification and more specifically to a portable water purification system designed to produce good quality drinking water.

There is today a great demand by the consuming public for high quality, better tasting drinking water. Due to the influence of diet on health, drinking water has now become to many the beverage of choice, substituting in large part drinking products high in sugar or laden with chemicals.

However, ordinary tap water is not always acceptable to consumers because of the alleged presence of impurities and, oftentimes, an unpleasant taste. Accordingly, many consumers are turning to purified, bottled water, as evidenced by numerous brands and varieties on sale in supermarkets and grocery stores.

In addition to producing a better quality, better tasting drinking product, it would seem advantageous if the product contained a higher concentration of calcium than that found in bottled waters available on the market. There is support in the medical profession that dietary calcium may play a role in the prevention of the debilitating bone disease of osteoporosis. This disorder, which results in a decrease of bone mass, is believed to be caused by a greater rate of bone resorption than of bone formation. It most commonly afflicts middle-aged and elderly people, especially women. Accordingly, drinking water containing calcium may prove beneficial in preventing this disease.

At present, a method of obtaining good quality drinking water fortified with calcium that does not involve the addition of chemicals has not yet been developed. It has been known to filter tap water through a particle filter and/or a carbon filter. Similarly, reverse osmosis membranes have been tried, as have ion exchange resins, to produce a better quality drinking water. However, the liquid resulting from such prior art methods may be undesirable because of the presence of biological impurities, added heavy metal from pipes, strange taste or odor, or because the water is completely without dissolved gases or salts that might be beneficial.

SUMMARY OF THE INVENTION

In accordance with the present invention, a liquid purifying system is provided in which liquid, such as water, is passed through a series of columns to remove particulate material and to ultimately add calcium. More specifically, water is first passed through a sand filter where particulate matter is removed. The water then passes through a carbon filter where excess chlorine and/or tri-halo methanes are removed. It next passes through a water softener for removal of divalent metals, such as calcium, magnesium, iron and manganese. Following this pretreatment, water passes into a storage tank where it is pumped into a reverse osmosis unit, such as that disclosed in U.S. Pat. No. 4,391,713 issued Jul. 5, 1983. The reverse osmosis unit is designed to recover variable percentages of the water pumped through the unit.

For additional removal of impurities where, for example, the solids comprising the recovered water from the first reverse osmosis treatment exceed desirable levels, the water can be pumped a second time through the reverse osmosis membrane. This membrane may be the same system used for the first pass or may be part of a second reverse osmosis system.

From the reverse osmosis unit, the water passes through a strong acid cation exchange resin, which converts the total dissolved solids in the water from a salt to an acid in an amount proportional to the anions present in the effluent. The acidified water then passes through a bed of pure calcium carbonate, which neutralizes the water. This neutralization of the acidified water adds calcium salt plus carbonic acid to the water, thus fortifying the water with calcium while at the same time improving the taste of the water.

The purified, calcium-enriched water is pumped into a second storage tank from which it is circulated to the delivery taps. The water is recirculated continuously from the second storage tank to the outlets where it is either dispensed to the public via an ultraviolet light protected tube or faucet, or returned to the second storage tank via a sterilizing inline ultraviolet light protected tube.

Accordingly, one object of the present invention is to provide a method of and system for producing a better quality and better tasting drinking water.

Yet another object of the present invention is to produce a good quality drinking water high in calcium.

Still another object of the present invention is to produce a good quality drinking water slightly lower in pH than tap water.

These and other objects and features of the present invention will become apparent to those skilled in the art from a reading of the description of the invention which follows.

DETAILED DESCRIPTION OF THE INVENTION

Figure 1:
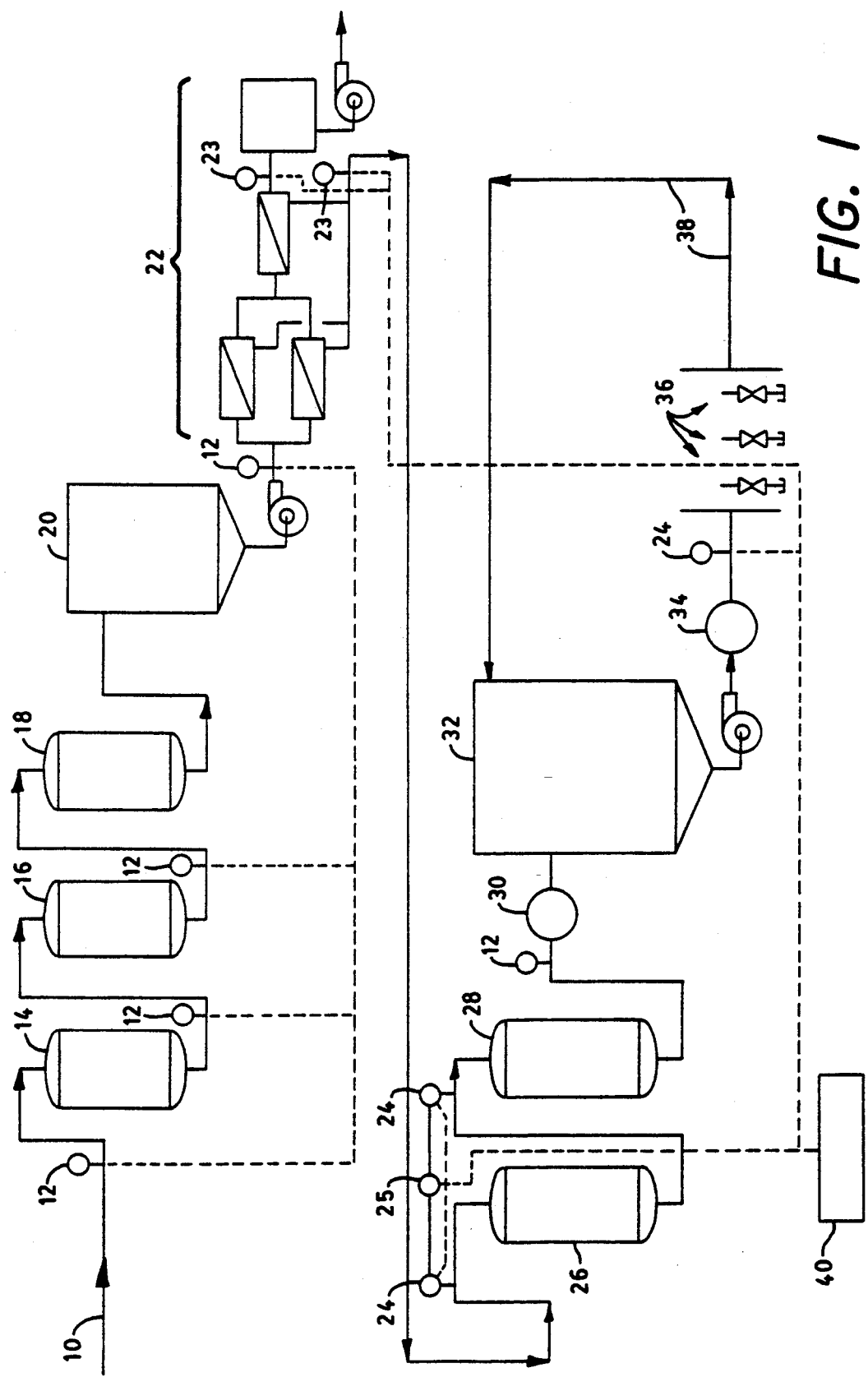
FIG. 1 is a schematic diagram showing the liquid purifying system of the present invention.

At the outset, the invention is described in its broadest overall aspects with a more detailed description following. In its broadest overall aspects, the present invention relates to liquid purification and, more specifically, to a method and system for preparing said purified liquid.

The method of the present invention provides for pretreatment of a liquid whereby the liquid is passed through a series of filters to remove particulate matter. The water then is pumped through a reverse osmosis membrane from which organic, inorganic compounds and other impurities are removed. The liquid then passes from the reverse osmosis membrane through a strong acid cation exchange resin for removal of the cations present in the reverse osmosis effluent. The liquid, now acidified, is neutralized by passing it through calcium carbonate. The neutralization of the acidified liquid adds calcium salt and carbonic acid to the liquid.

In the most preferred embodiment, as seen in FIG. 1, a liquid, such as water, is first passed as shown by arrow 10 through a sand filter 14 to remove particulate matter. The water then passes through a carbon filter 16 to remove any residual chlorine or tri halo methanes which may cause damage to the ion exchange resins and reverse osmosis membranes, or pass through into the final product. The water is next passed through a water softener 18 in which divalent and trivalent cations, such as calcium, magnesium, iron and manganese, are exchanged for sodium ions. The water is now more concentrated with sodium ions. The removal of these elements is significant because their presence in the water interferes with the functioning of the reverse osmosis system.

Having undergone such pretreatment, the water is passed into a storage tank 20 and then pumped through a reverse osmosis system 22. The reverse osmosis system contains a reverse osmosis membrane, not shown, designed to yield 75-80 percent recovery of the water. For example, for every 100 gallons of water fed through the pretreatment system, 75-80 gallons of water are recovered. The reverse osmosis membrane removes organic compounds having a molecular weight greater than 200. It further removes up to 90-97 percent of ionized impurities, as well as biological impurities including pyrogenic substances.

In a second embodiment of the present invention, the reverse osmosis membrane can be tailored depending on the amount of total dissolved salt desired to be recovered. For example, the reverse osmosis membrane can be tailored so that it removes only 80 percent of the total dissolved solids from the water. The use of such a membrane increases the amount of calcium in the effluent stream to match the salt content of the water from the membrane.

A further embodiment is to use a double pass reverse osmosis system. If the total dissolved solids in the reverse osmosis effluent exceed the amount desired, the water can be pumped a second time through the reverse osmosis membrane for additional removal of impurities. In this embodiment, the membranes of the double pass reverse osmosis unit can be varied or matched to yield a final effluent between 10 and 30 parts per million of residual salt.

In yet another embodiment, if water is fed into the liquid purifying system containing salts of low concentration, the process of passing the water through the reverse osmosis system 22 can be omitted. The water will pass directly from the first storage tank 20 to the cation exchange resin 26 and the calcium carbonate 28. The liquid product will contain calcium in direct proportion to the original strong acid anions present in the feed water.

In the most preferred embodiment, the water passes from the reverse osmosis unit through a strong acid cation exchange resin 26, also known as a cation polisher, which removes the majority of the cations that are present in the reverse osmosis effluent, exchanging them for hydrogen ions. The acidified water then passes through a bed of pure calcium carbonate 28, also known as a calcium carbonate polisher. The effluent both to and from the acid cation exchange resin 26 is monitored by sensor 24, which measures the resistivity of the liquid purifying system. Pressure, flow, and resistivity measurements are taken continuously by sensors 12, 23 and 24 to monitor the operation of the system. It is possible to measure the exhaustion of the cation exchange in any of the embodiments by comparing the inlet and outlet resistivities. In FIG. 1, the exhaustion of the cation exchange is measured by monitor 25.

The water from the calcium carbonate polisher, which now contains calcium salt and carbonic acid, is purified by passing it through a micro meter filter 30, said filter ranging in size from 1-5 micro meters. The net result is an increase in the amount of calcium in the effluent stream.

At this point, the acidified water will have been neutralized by the calcium carbonate 28 and carbonic acid will have been added in proportion to the cations from the reverse osmosis combined with the alkalinity, if any, originally present in the water. The size of the cation columns used will vary depending on the size and desired output of the liquid purifying system. The water is now fortified with calcium, which is advantageous in the prevention of osteoporosis. The presence of bicarbonate lowers the pH of the water, thus improving its flavor. This improvement in flavor can sometimes be obtained with purified water which has not been prepared using reverse osmosis by passing the purified water through calcium carbonate.

The purified, calcium-enriched water passes into a second storage tank 32. Then, it is circulated to the delivery taps 36. Before reaching the delivery taps 36, the water may be further purified by passage through a second micro meter filter 34, said filter ranging in size from 0.22-1 micro meters. Thus, the water is continuously circulated from the second storage tank 32 through the filter 34 to the delivery taps 36 where it is dispensed to the public via a sterilizing ultraviolet light protected tube or faucet, not shown. The ultraviolet light applied is 254 nanometers. The water not dispensed will be returned to the storage tank 32 via an inline ultraviolet light protected tube 38. The ultraviolet light applied here will be between 180-260 nanometers. The inline ultraviolet light protected tube 38 maintains a low biological level in the storage tank 32 and distribution system. In lieu of the inline ultraviolet light the water may be protected by an immersion radiation source mounted within the tank.

Water dispensed to the public is dispensed by a coin operated timer which opens a solenoid valve, not shown, for a fixed period of time. The fixed period of time will be an amount of time sufficient to allow one gallon of water to flow from a pressure activated positive displacement pump located at each tap 36. As explained above, the water that is not dispensed passes through a sterilizing inline ultraviolet light protected tube 38 to maintain biological quality. Proper functioning of the method and system may be monitored by a computer 40. The computer 40 may be located at a remote site and designed to pick up input signals and provide output instructions via a telephone line or radio transmission. The level of solid state control and information storage within the containment vessel of the system will vary depending upon the sophistication of the operation. Multiple units may be monitored by the same central computer to insure proper operations, water quality, and prompt response to service problems, as detected by the monitoring system.

The invention may be embodied in other specified forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

What is claimed is:

1. A method for purifying liquid in a system comprising a portable liquid purification unit, said method comprising:

a) passing a liquid through a sand filter;

b) passing the effluent from a) through a carbon filter;

c) passing the effluent from b) through a water softener;

d) collecting the effluent from c) in a storage tank, from where said effluent is pumped into and through a reverse osmosis membrane;

e) passing the effluent from d) through a strong acid cation exchange resin in the hydrogen form for acidifying the effluent;

f) directly thereafter passing the effluent from e) through a bed of calcium carbonate for neutralizing the effluent; and g) collecting the effluent from f) in a second storage tank.

2. The method of claim 1 further comprising:

h) recovering the effluent from g) and circulating said effluent to the delivery taps.

3. The method of claim 2 wherein the effluent from h) is purified by passing it through a 0.22-1 micro meter filter.

4. The method of claim 2 wherein said effluent is dispensed through said delivery taps, said delivery taps being controlled by a timing means.

5. The method of claim 4 wherein said timing means comprises the opening and closing of a solenoid valve for a fixed period of time.

6. The method of claim 1 further comprising:

i) recovering the effluent from g) and returning said effluent to said second storage tank.

7. The method of claim 1 wherein the reverse osmosis membrane of d) leaves a residual of 1-150 parts per million.

8. The method of claim 1 wherein the effluent from f) is purified by running it through a 1-5 micro meter filter.

9. The method of claim 1 wherein the purified liquid is dispensed via a sterilizing ultraviolet light protected tube or faucet.

10. The method of claim 9 wherein the ultraviolet light is 254 nanometers.

11. The method of claim 1 wherein the purified liquid not dispensed is returned to said second storage tank via a sterlizing ultraviolet light protected tube.

12. The method of claim 11 wherein the ultraviolet light is between 180 and 260 nanometers.

13. A system for purifying liquid comprising:

a) means for passing a liquid through a series of filters, such as a sand filter, carbon filter or water softener;

b) a storage tank into which the effluent from a) is collected and stored;

c) a reverse osmosis membrane through which the effluent from b) is pumped;

d) means for first acidifying effluent and then directly thereafter neutralizing effluent including, an acid cation exchange resin in the hydrogen form through which the effluent from c) is passed; and a bed of calcium carbonate through which the effluent from d) is passed; and e) a second storage tank into which the effluent from e) is collected and stored.

14. The system of claim 13 further comprising delivery taps to which the effluent from f) is circulated.

15. The system of claim 14 wherein the effluent from f) is purified by passing it through a 0.22-1 micro meter filter prior to reaching the delivery taps.

16. The system of claim 14 wherein the delivery taps are controlled by a timing means, which means allows said effluent to be dispensed.

17. The system of claim 16 wherein the timing means open and close a solenoid valve for a fixed period of time.

18. The system of claim 13 wherein the reverse osmosis membrane of c) leaves a residual of 1-150 parts per million.

19. The system of claim 13 further comprising a 1-5 micro meter filter through which the effluent from e) is passed and purified.

20. The system of claim 13 further comprising a sterilizing ultraviolet light protected tube or faucet for dispensing the purified liquid, said ultraviolet light being 254 nanometers.

21. The system of claim 13 further comprising a sterilizing inline ultraviolet light protected tube for returning the purified liquid to the second storage tank, said ultraviolet light being between 180 and 260 nanometers.

22. The system of claim 13 wherein the functioning of the purifying system is monitored and/or operated by computer.

23. A method of producing a purified drinking water enriched with calcium comprising:

a) passing the water through a cation exchange resin in the hydrogen form for acidifying the water; and b) directly thereafter passing the effluent from a) through a bed of calcium carbonate for neutralizing.

* * * * *